United States Patent [19]
Price et al.

[11] Patent Number: 5,875,906
[45] Date of Patent: Mar. 2, 1999

[54] TAMPER EVIDENT SLEEVES AND METHOD OF FORMING THEM

[75] Inventors: Michael L. Price, Mountaintop, Pa.; Claudio Zapata Gomez, Mexico City, Mexico; James Kropke, Palm Harbor, Fla.

[73] Assignee: Zapata Innovative Closures, Inc., Coconut Grove, Fla.

[21] Appl. No.: 653,454

[22] Filed: May 24, 1996

[51] Int. Cl.⁶ .................................................... B65D 41/34
[52] U.S. Cl. ........................................... 215/252; 215/276
[58] Field of Search .................................. 215/252, 251, 215/253, 254, 256, 258, 274, 276, 328, 329, 901, 44, 43, 220, 217, 218, 219

[56] References Cited

U.S. PATENT DOCUMENTS

| | | | |
|---|---|---|---|
| 3,968,894 | 7/1976 | Herrmann | 215/220 |
| 4,709,824 | 12/1987 | Thompson | 215/252 |
| 4,813,561 | 3/1989 | Ochs | 215/252 |
| 5,263,600 | 11/1993 | Henning | 215/328 |
| 5,341,949 | 8/1994 | Hayes | 215/274 |
| 5,579,934 | 12/1996 | Buono | 215/220 |

*Primary Examiner*—Stephen K. Cronin
*Assistant Examiner*—Nathan Newhouse
*Attorney, Agent, or Firm*—Rogers & Wells LLP

[57] ABSTRACT

A tamper evident sleeve and method of forming the sleeve. The tamper evident sleeve is used in conjunction with a closure or cap, such as a twist-off metal crown seal, for a container or bottle. The sleeve has a skirt made from plastic material which engages the crown seal and rotates with the crown seal in opening and closing the container without discomfort or injury which can be encountered in-directly gripping a metal crown seal. The sleeve also includes a tamper evident feature depending from the skirt of the sleeve which indicates the condition of the container upon the initial removal of the sleeve and crown seal.

15 Claims, 9 Drawing Sheets

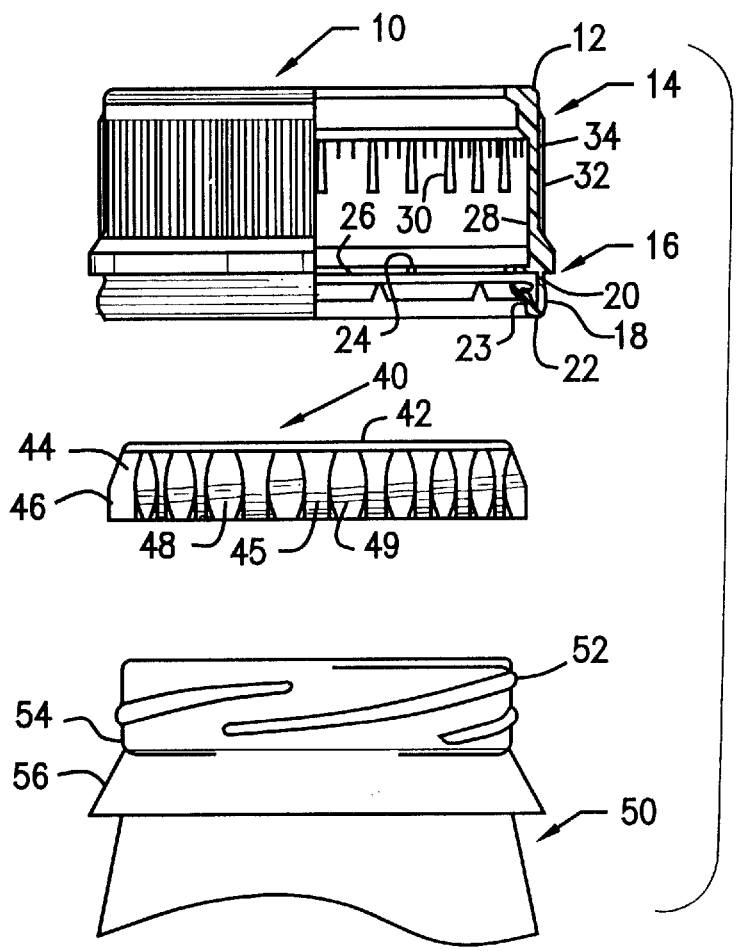
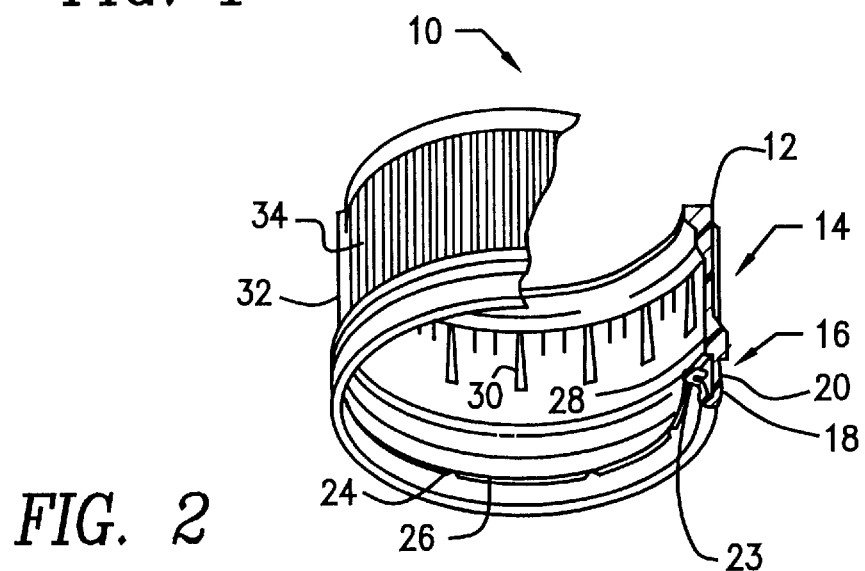
FIG. 1
FIG. 2

TAMPER EVIDENT SLEEVES AND METHOD OF FORMING THEM

FIELD OF THE INVENTION

The present invention relates to tamper evident sleeves for use in conjunction with closures or caps used to seal containers or bottles, and more particularly to tamper evident sleeves for use in conjunction with the twist-off crown seals. The invention also relates to the method of forming the tamper evident sleeves.

BACKGROUND OF THE INVENTION

Closures such as crown seals or caps are routinely used and are well known in the art for sealing the openings of containers or bottles which typically contain carbonated or other beverages. With respect to crown seals, they are commonly formed of metal sheet material and comprise a top, a sidewall with a flared skirt. The skirt includes a plurality of flutes which extend around the circumference thereof at spaced intervals. When applied to cover an open end of a bottle, these flutes are bent or crimped at the points of intersection between the top and the skirt, gripping a bead at the upper rim of the bottle opening for sealing.

In recent years "twist-off" crown seals have become more popular and are used by beverage manufacturers. The twist-off crown seals are convenient and preferred by consumers because they can be removed from bottles without the use of bottle openers. The twist-off crown seal includes internal threads which engage corresponding external threads on the container or bottle. The twist-off crown seal is removed by rotating the crown seal to unthread the crown seal from the bottle.

To obtain a seal of sufficient strength which will withstand the pressure of the contained carbonated or other beverages, a metal such as steel is typically used to form the crown seal. The metal flutes are relatively sharp, however, and can be injurious when grasped by a consumer when the bottle is picked up or opened. Particularly with the twist-off crown seal design, the sharp edges of the flutes can be painful and dangerous as the crown seal is removed.

With respect to tamper evidence, moreover, crown seals, particularly twist-off crown seals, can easily be replaced onto the bottles after being removed with little or no evidence that the bottles have been opened or tampered with. Thus, crown seals for bottles are beset with drawbacks and problems associated with their removal and replacement in opening and closing containers, such as bottles.

SUMMARY OF THE INVENTION

The present invention provides a new and unique tamper evident sleeve for closures or caps, preferably for metal twist-off closures for containers or bottles, which facilitates the opening and closing of the containers without discomfort or injury, and wherein the sleeve also can have a lower breakaway or separable band portion which indicates the condition of the container upon initial removal of the closure and sleeve. This invention also provides a method for producing the tamper evident sleeves. In a preferred embodiment of the present invention a tamper evident sleeve is produced which can be used with the twist-off crown seal for a container or bottle. Generally, the tamper evident sleeve of the present invention can be used in conjunction with a twist-off crown seal which seals a container or bottle having an opening surrounded by a lip or bead at its upper rim with a depending neck having upper engaging means for releasably engaging the twist-off crown seal and lower intefering means for providing an interference with the lower separable band portion of the tamper evident sleeve. The tamper evident sleeve fits on or over the crown seal and includes means for engaging the twist-off crown seal so that the twist-off crown seal turns in cooperation with the tamper evident sleeve when the sleeve is rotated to remove or place the twist-off crown seal from and on the container or bottle opening. The tamper evident sleeve provides an outer gripping surface when removing or placing the crown seal from or on the container or bottle which prevents injury when opening or closing the container or bottle. At the same time and upon the initial removal of the twist-off crown seal from the container or bottle, the lower band portion of the tamper evident sleeve will engage the lower interfering means of the container or bottle and will either break from the sleeve entirely or partially, or will separate into segments while remaining attached to sleeve as the sleeve is removed with the crown seal, all to indicate the condition of the container or bottle.

In accordance with another preferred embodiment of the present invention, the tamper evident sleeve is made of a plastic material, and comprises an annular top portion and an annular skirt portion depending from the top portion. The skirt portion can include means for engaging the external flutes of a twist-off crown seal when the sleeve is placed on or over the crown seal, and a breakaway band depending from the skirt portion having a curled portion at its lower end provides a reduced internal dimension which engages the underside of the bottle interfering means. In addition, lines of weakness in the breakaway band can be included either as an intermediate peripheral line of weakness between the skirt and curled portion or one or more vertical lines of weakness in the curled portion or both.

When placing the tamper evident sleeve on or over the twist-off crown seal of a bottle, the curled portion of the sleeve is sufficiently resilient to pass about and below the bottle interfering means and into interfering engagement therewith without apparent rupturing of the described lines of weakness. Upon initial removal of the twist-off crown seal, the tamper evident sleeve provides a smooth gripping surface and the engaging means of the skirt portion of the sleeve engage the flutes of the crown seal. Such engagement facilitates removal of the crown seal when the sleeve is rotated by directly translating the rotational force from the sleeve to the crown seal, so that the sleeve and crown seal rotate in cooperation when unthreading the crown seal. As the crown seal is unthreaded from the bottle neck by rotating the sleeve, the sleeve/crown seal combination will move in an upward axial direction in response to the unthreading torque applied, and the lines of weakness will rupture leaving the curled breakaway band portion on the bottle while allowing the sleeve and crown seal to be removed. The breakaway band thus provides a clear indication of tampering or opening.

Thus, the sleeves of the present invention are designed to facilitate opening and closing the containers with closures, such as a twist-off metal caps or crown seals, without discomfort and injury, and, at the same time, indicate the condition of the containers, to thereby provide evidence of tampering.

In forming the tamper evident sleeves of the present invention, a sleeve can be formed first by conventional molding techniques, such as injection or compression molding which includes a skirt with internal means, such as protrusions extending from the upper portion of the inner wall of the skirt, for engaging external means, such as flutes, on the external wall of the closure, and with an integral generally cylindrical lower wall depending from the skirt of the sleeve. The lower cylindrical wall includes an upper section frangibly connected to the skirt by a peripheral line of weakness or one or more vertical lines of weakness or both. The curled breakaway band portion of the tamper evident sleeve is formed by curling the lower cylindrical wall into a desired curvilinear cross-sectional shape, such as an O, U, J, coil, trapezoidal or triangulated curl. The outside diameter of the curl is typically close to that of its original outside diameter and its inside diameter is substantially less that the outside diameter of the bottle interfering means. The forming of the curled breakaway band portion is achieved by means of a curling tool which compresses the lip of the cylindrical wall thereby turning it inwardly and then upwardly channeling and gradually altering the direction of such movement over its curved working surfaces to form the desired curl.

It is to be understood that while the sleeve of the present invention preferably can be used for crown seals, wherein the sleeve also can include a curled breakaway band, the invention in its broader aspects is not limited to crown seals or to curled breakaway bands. Generally, closures with sleeve engaging means, and tamper evident indicators which perform the functions generally described herein may be used in accordance with the disclosed invention, and would be within the scope of the accompanying claims.

BRIEF DESCRIPTION OF THE DRAWINGS

The accompanying drawings, which are incorporated in and constitute part of this specification, are illustrative embodiments of the invention.

FIG. 1 is an exploded front elevational view, partially in section, of the tamper evident sleeve of the present invention and a typical crown seal for sealing a bottle;

FIG. 2 is a perspective view of the tamper evident sleeve, partially broken away to show the details thereof;

DETAILED DESCRIPTION OF THE DRAWINGS

Figure 3:
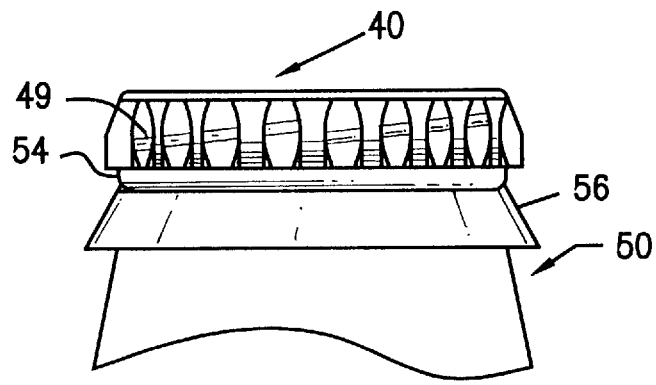
FIG. 3 is a front elevational view of a typical crown seal secured to and sealing a bottle.

Referring now to FIGS. 1 and 2, there is shown a preferred embodiment of the tamper evident sleeve of the invention along with a crown seal and bottle or container. The tamper evident sleeve 10 is made of plastic material and has a top portion 12, an annular depending skirt 14 including an intermediate peripheral line of weakness 16 and a lower breakaway band 18. The illustrated breakaway band 18 includes an upper end 20 and a free curled lower end 22. As shown, the end of the curled lower end 22 is curled inwardly and forms a "triangulated curl" band including an inside portion 23. The triangulated curl breakaway band configuration is described in detail in applicant's U.S. Ser. No. 08/206,028, filed Mar. 3, 1994, which is incorporated herein by reference. The peripheral line of weakness 16 comprises a plurality of spaced apart frangible bridges 24 connecting the skirt 14 with the upper end 20 of breakaway band 18 and slots 26 between and separating the bridges 24. The inner cylindrical surface 28 of the skirt 14 includes protrusions 30 which function to engage crown seal 40, as will be discussed in detail below. The diameter of the inner surface 28 of the skirt 14 is the same as or slightly smaller than the outermost diameter of the crown seal 40, so that the sleeve 10 can be securely press fitted onto the crown seal, as will be discussed below. The exterior cylindrical surface 32 of the skirt 14 can also include ridges 34 to facilitate gripping of the sleeve 10.

As illustrated, in this embodiment of the invention the sleeve 10 is open at both ends, wherein the upper end includes a top portion 12 having a top annular flange 13 extending inwardly from the skirt 14 into the upper opening. The flange 13 functions to limit the movement of the sleeve 10 when the sleeve is fitted on the crown seal, as will be described below. In accordance with the present invention, it is not necessary that the sleeve 10 have a top portion or an opening at its top end. For example, the sleeve 10 may be entirely open or closed at its top end.

The cap or crown seal 40 shown in FIG. 1 is of the "twist-off" type well known in the art for sealing bottle openings. The crown seal 40 is formed of sheet material such as steel, and comprises a top portion 42, a downwardly depending skirt 44, and an annular rim or flange 46 extending outwardly from the skirt. The flange 46 is corrugated to provide a plurality of flutes 48 which extend around the circumference thereof at spaced intervals. Each flute comprises a substantially trapezoidally shaped trough or depression 43 defined between a pair of complimentary shaped crests 45. The skirt 44 can also include internal threads 49 which generally correspond with the external threads 52 on a bottle 50. When applied to cover the open end of the bottle 50, the flutes 48 are crimped, bending at the point of intersection between the top 42 and the skirt 46, and gripping the external threads 52 at the upper rim of the bottle neck 54 to seal the bottle 50. The bottle 50 also includes a locking ring 56, which is used to retain the breakaway band 18 upon removal of the sleeve 10 and crown seal 40, as will be discussed in greater detail below.

The number of and spacing of protrusions 30 in the skirt 14 should be such that there will always be at least one protrusion engaged in the flutes 48 of the crown seal 40 so that the crown seal turns in cooperation with the sleeve when the sleeve is rotated, without slippage of the sleeve during rotation. Preferably, the number of protrusions 30 in the skirt 14 should not be the same as the number of flutes 48 on the crown seal 40. Illustratively, the total number of protrusions 30 should be one less than the total number of flutes on the crown seal. A typical crown commonly used in the art contains twenty-one flutes. Thus, in the most preferred embodiment of the sleeve 10, there should be twenty protrusions in the skirt 14. The difference in the number of protrusions 30 to flutes 48 allows for a secure and tight grip of the crown for the application positions of the sleeve 10. The difference or mismatch allows several of the protrusions 30 to grip the flutes 48 tightly to avoid slipping when rotating the sleeve 10 to remove the crown seal 40.

The shape of the protrusions 30 preferably should generally correspond to the geometry of the flutes 48 of the crown seal 40 after they are crimped onto the bottle 50. For typical crown seals commonly used in the art, the protrusions 30 should increase in width and height in the direction towards the tamper evident band 18, as shown in FIG. 1. The matching of the general geometry of the flutes helps to provide a secure fit when the protrusions 30 interact with the flutes 48 of the crown seal 40 as the sleeve 10 is rotated to remove the crown seal.

It is not necessary for the protrusions 30 to be spaced evenly around the inner surface 28 of the skirt 14 for the sleeve 10 to function in accordance with the invention. The protrusions 30 may be spaced unevenly, or may be included in only a portion of the inner surface 28 of the skirt 14.

Referring now to FIG. 3, the crown seal 40 is shown attached to the bottle neck 54. The crown seal 40, being of the twist-off type commonly used in the art, includes internal threads 49 which generally correspond to the external threads 52 of the bottle neck 54. To remove the twist-off crown seal 40, the crown seal is rotated, and the internal threads 49 of the crown seal and bottle interact so that the crown seal is "unscrewed" from the bottle neck, thus opening the bottle 50.

Figure 4:
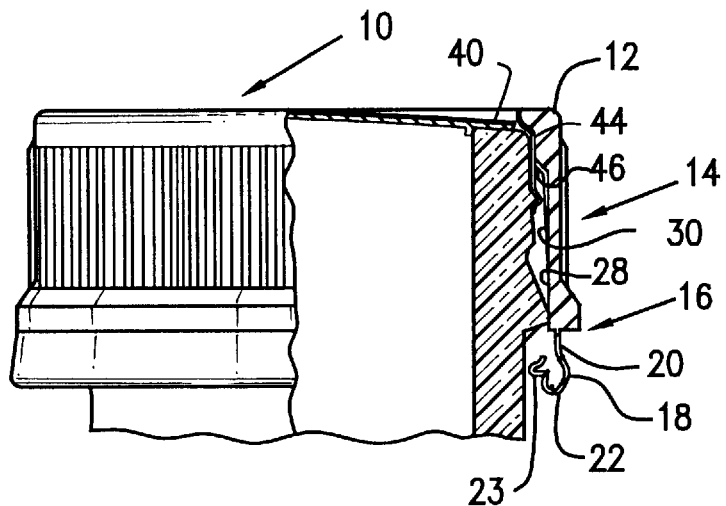
FIG. 4 is a front elevational view, partially in section, of the tamper evident sleeve applied on or over the top of a bottle neck sealed with a crown seal.
Figure 5:
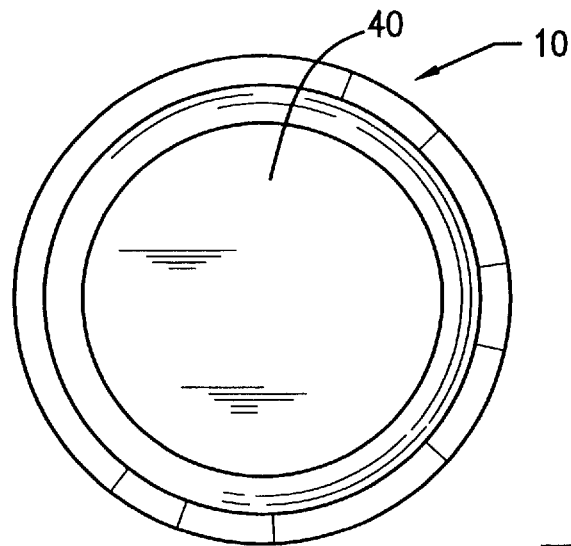
FIG. 5 is a plan view of the tamper evident sleeve applied to a bottle sealed with a crown seal.
Figure 6:
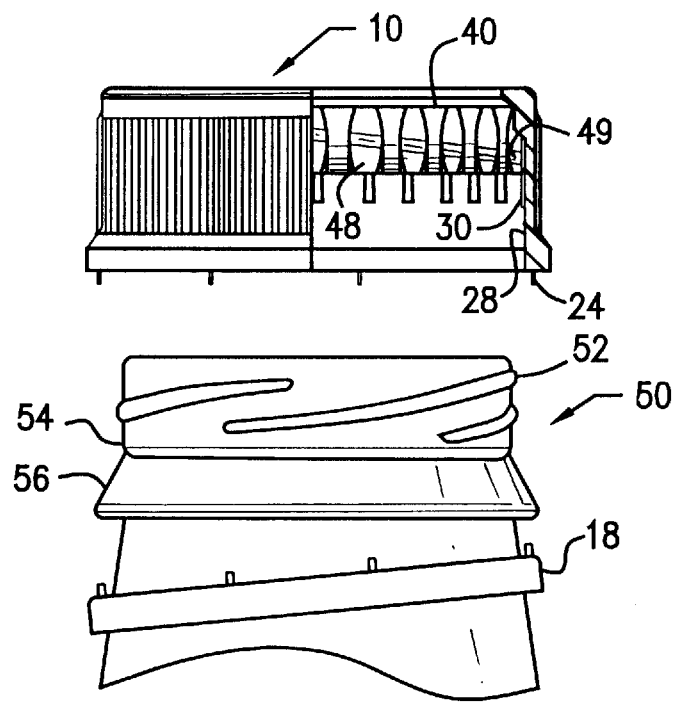
FIG. 6 is front elevational view, partially in section, of the tamper evident sleeve, and a crown seal of FIG. 5, wherein the tamper evident sleeve and crown seal have been removed from the bottle neck, leaving the tamper evident band thereon as evidence of opening or tampering with the bottle.

Referring now to FIGS. 4–6, there is illustrated the use of the tamper evident sleeve 10 of FIGS. 1 and 2 in conjunction with the bottle/crown seal combination of FIG. 3. After the bottle 50 has been sealed with the crown seal 40 as shown in FIG. 3, the sleeve 10 is applied, in this embodiment, on the crown seal 40 by press fitting the sleeve over the crown seal 40 until the top annular flange 13 of the sleeve 10 rests upon the top portion 42 of the crown seal 40, thus stopping any further movement of the sleeve 10 as shown in FIG. 4. As the sleeve is pressed over the crown seal 40, the inside portion 23 of the breakaway band 18, which is a smaller dimension than the locking ring 56, is stretched or deflected and forced past the locking ring 56 into an interfering engagement therewith. When seen from the top view, the sleeve 10 covers the perimeter of the crown seal 40, leaving the center of the crown seal exposed as shown in FIG. 5. As was discussed above, the inner cylindrical surface 28 of the sleeve 10 includes engaging means such as protrusions 30 which interact with the flutes 48 of the crown seal 40 and function to engage crown seal when the sleeve 10 is rotated so that the crown seal rotates in cooperation with the sleeve. Preferably, the number of protrusions 30 in the skirt 14 should not be the same as the number of flutes 48 on the crown seal, and most preferably, the total number of protrusions 30 should be one less than the total number of flutes on the crown seal. The shape of the protrusions 30 preferably should generally correspond to the geometry of the flutes 48 of the crown seal 40 after they are crimped onto the bottle 50.

To remove the crown seal 40 from the bottle neck 54, the sleeve 10 is rotated like a standard twist-off cap, during which the protrusions 30 of the sleeve engage the flutes 48 of the crown seal so that the crown seal is rotated in cooperation with the sleeve. As the crown seal is rotated, the internal threads 49 of the crown seal interact with the external threads 52 on the bottle neck 54, so that the crown 40 is unthreaded, causing and the sleeve/crown seal combination to move in an upward axial direction from the bottle neck. During the concurrent upward movement of the sleeve/crown seal combination, the breakaway band 18 of the sleeve is restrained from upward movement by the locking ring 56 on the bottle 50 so that the unthreading action will rupture bridges 24 leaving the breakaway band 18 on the bottle neck 54 as evidence that the bottle has been previously opened. This is illustrated by FIG. 6. After the sleeve 10 and crown seal 40 are initially unthreaded from the bottle 50, the crown seal 40 will remain lodged in the sleeve 10, as shown in FIG. 6, because the diameter of the inner surface 28 of the skirt 14 is the same or slightly smaller than the outermost diameter of the flutes 48 of the crown seal 40.

Figure 7:
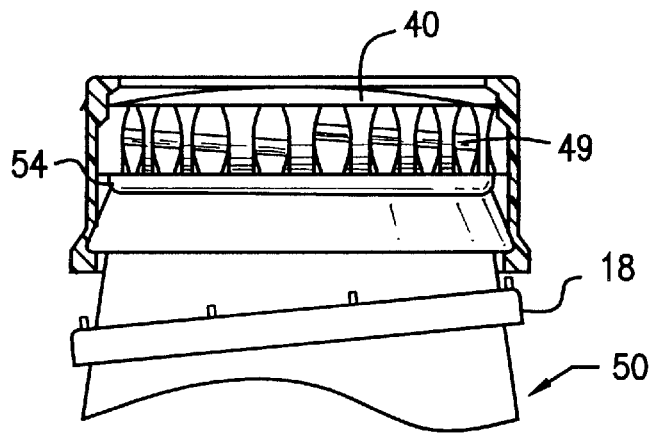
FIG. 7 is front elevational view of the tamper evident seal and crown seal of FIG. 6, wherein the tamper evident sleeve with the crown seal therein re-applied to the previously opened bottle.

As shown in FIG. 7, the sleeve/crown seal combination can be reused after being unthreaded from the bottle 50, similar to an ordinary twist-off cap. After the bottle is opened, the sleeve/crown seal combination can be re-threaded onto the bottle neck 54 by engaging the internal threads 49 of the crown seal 40 and the external threads 52 of the bottle 50, and rotating and pressing the sleeve/crown seal combination onto the bottle neck 54. Since the breakaway band 18 remains on the bottle neck 54 after initial opening of the bottle, there is clear evidence that the bottle has been previously opened, even though the sleeve/crown seal combination has been re-applied onto the bottle.

Figure 8:
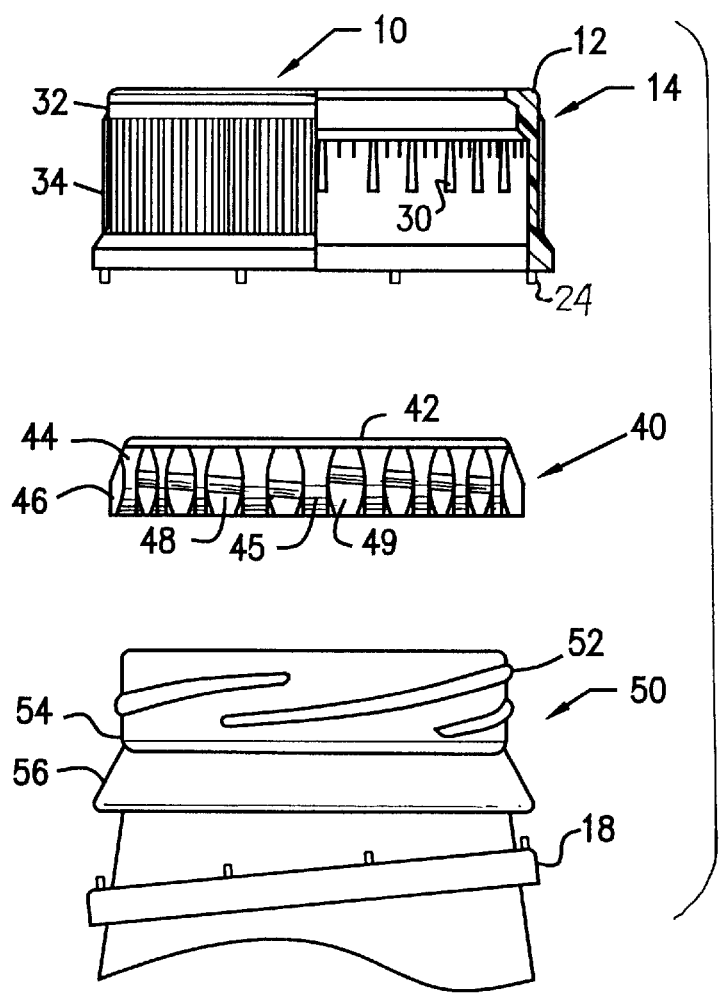
FIG. 8 is front elevational view of the tamper evident seal and crown seal of FIG. 6, wherein the crown seal has been removed from the tamper evident sleeve after removal from the bottle neck.

Alternatively, as illustrated in FIG. 8, the crown seal 40 can be separated from the sleeve 10 anytime after initial opening of the bottle by pushing downwardly on the top of the crown seal through the opening in the top of the sleeve 10. By separating the sleeve 10 and the crown seal 40 after initial opening of the bottle, the crown seal can be used to reseal the bottle without the sleeve 10. The ability to separate the sleeve 10 and crown seal 40 after initial opening of the bottle is also important for recycling purposes, since the sleeve and crown seal will generally be made of different materials (i.e., plastic for the sleeve and metal for the crown seal).

Figure 9:
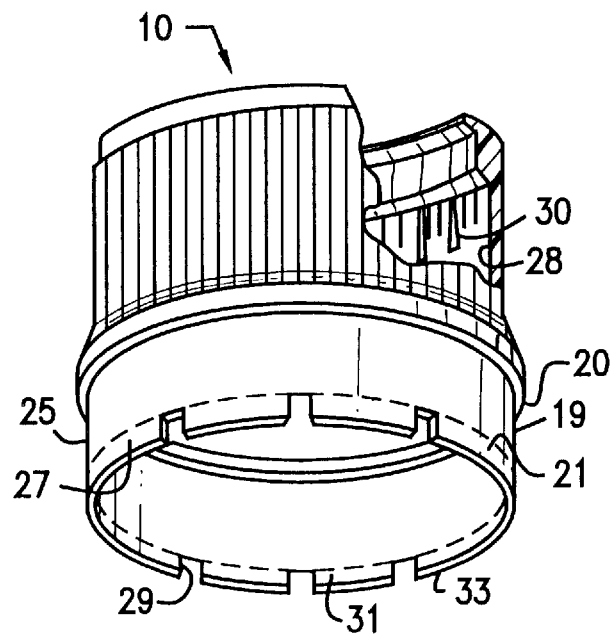
FIG. 9 is a perspective view of the tamper evident sleeve after molding and which, at this stage, includes an upper portion having protrusions extending inwardly from the skirt wall for engagement with a closure and a lower preform portion for a tamper evident band.

FIG. 9 shows the tamper evident sleeve 10 of FIGS. 1 and 2 after molding and before formation of the curled breakaway band 18, having a lower annular band 19 with a lower free end 21 having a lip 33. The lower annular band 19 further includes a peripherally continuous intermediate portion 25 which is adjacent to the peripherally discontinuous section 27 at its lower end and adjacent to the frangible bridges 24 at its upper end. As also shown, the peripherally discontinuous section 27 comprises a plurality of slots 29 which extend from the lip 33 of the lower free end 21 to the lower portion of the peripherally continuous intermediate portion 25, but not thereinto (as shown by the dotted line), thus forming a plurality of tabs 31 each bounded by the slots 29, the lip 33 of free end 21, and the lower portion of peripherally continuous intermediate portion 25. The preform sleeve 10 further comprises a plurality of protrusions 30 along the periphery of the inner cylindrical surface 28 of the skirt 14 which function to engage crown seal as described above. Preferably, the number of protrusions 30 in the sleeve 10 should be less than the number of flutes 48 on the crown seal 40, and most preferably, the total number of protrusions 30 should be one less than the total number of flutes on the crown seal. The shape of the protrusions 30 preferably should generally correspond to the geometry of the flutes 48 of the crown seal 40 after they are crimped onto the bottle 50.

The preform sleeve 10 of the present invention, such as illustrated in FIG. 9, can be molded by any suitable known process, such as by injection or compression molding, with any variety of suitable plastic materials, for example polypropylene, polyethylene, and the like. In one embodiment of such methods, the preform sleeve can be molded with a peripherally discontinuous portion in the annular band 19, comprising at least one separation in the form of a slot or other separating configuration as described above. This embodiment is described in detail in applicant's U.S. Ser. No. 08/206,028, filed Mar. 3, 1994, which has been incorporated hereinabove by reference.

Figure 10:
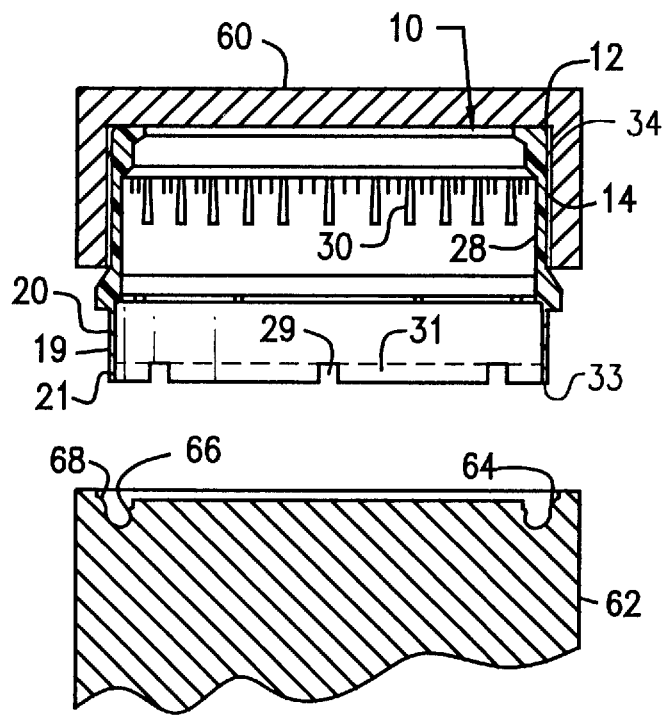
FIG. 10 is a front elevational view, in section, of the tamper evident sleeve of FIG. 9, wherein the preform is about to be engaged by a curling tool.
Figure 11:
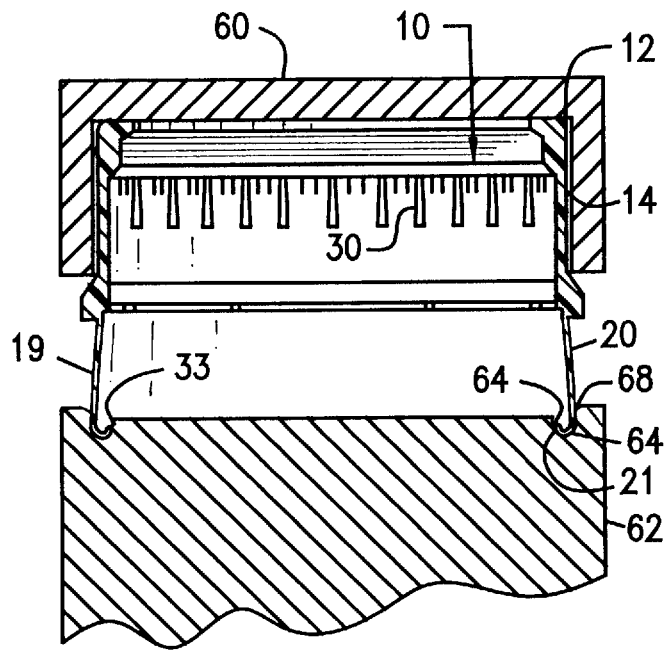
FIG. 11 is generally the same as FIG. 10, except that the curling tool has engaged the preform and initiated the inward curling of the free end thereof.
Figure 12:
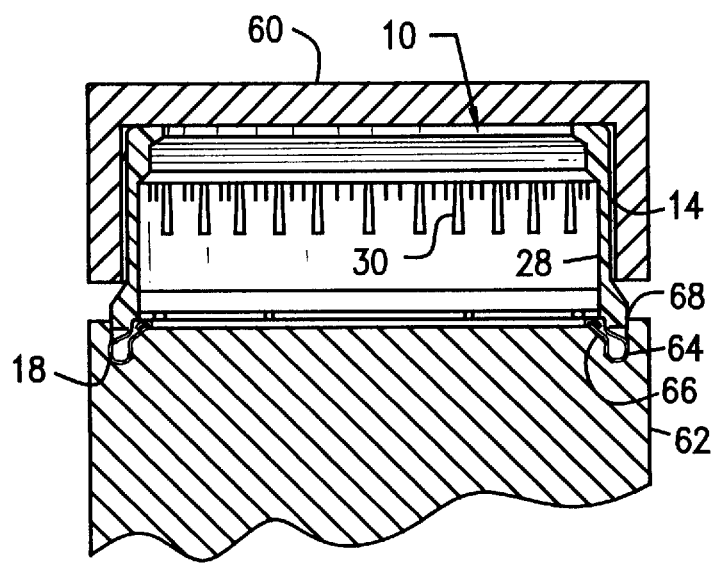
FIG. 12 is a front elevational view, in section, of the curling tool and preform in the final stage of engagement, just prior to release of the tool and completion the curling process.

Referring to FIGS. 10–12, there is shown a preferred method of forming the breakaway band 18 of the sleeve 10 shown in FIGS. 1 and 2. As shown in FIG. 10, the preform sleeve 10 of FIG. 9 is held in a holder 60 and already has been formed by conventional molding techniques as discussed above, with the lower annular band 19 having its upper end 20 integral with its lower free end 21 ready for curling. The curled lower end 22 of the breakaway band 18 is formed with a curling tool 62, which in FIG. 10 has been positioned under the sleeve 10 ready to engage the lip 33 of the lower annular band 19. The curling tool 62 includes an annular working surface 64 of a cross section suitable for shaping and dimensioning the triangulated curl of the curled lower end 22.

As shown in FIG. 11, the forming operation is accomplished by pressing the working surface 64 of the tool 62 against the lip 33 of the lower annular band 19. In this embodiment the working surface 64 includes an internal protrusion 66 which facilitates shaping of the triangulated curl of the curled lower end 22. Also, the working surface 64 has a slanted portion 68 extending outwardly from the working surface 64 to facilitate centering of the tool and sleeve. As the tool 62 engages the lip 33 and moves toward the sleeve 10, the band curls so that the upper end 20 of the band 19 becomes the outer wall of the breakaway band 18, and the lower free end 21 becomes the inner wall of the breakaway band.

The triangulated curl embodiment of the breakaway band 18 is formed by engaging the lower free end 21 with the tool 62 and moving the tool toward the sleeve 10, wherein the tool turns the engaged free end inwardly and then upwardly along the working surface 64, whereupon the free end of the inner wall being formed is restrained, such as by the lower surface of the skirt 14. Thereafter, the continued relative movement of the tool 62 toward the sleeve 10 causes compression of the restrained inner wall and triangulation of the breakaway band 18. This is illustrated in FIG. 12. The compression provides a concave inner wall for the band, so that the curled breakaway band 18 has a triangulated curl configuration, as shown in FIGS. 1 and 2. After formation of the curled breakaway band, a peripheral line of weakness may be formed in the breakaway band by way of a post-forming slitting operation. The method for forming the triangulated curl embodiment of the breakaway band is described in applicant's U.S. Ser. No. 08/206,028, filed Mar. 3, 1994, which has been incorporated hereinabove by reference.

Figure 13:
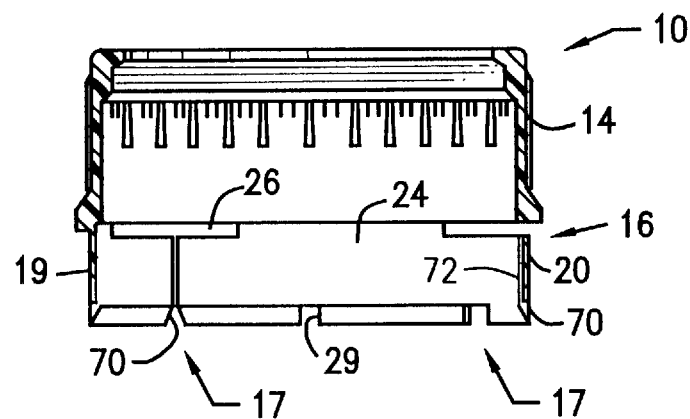
FIG. 13 is a front elevational view, in section, of another embodiment of the tamper evident sleeve after molding, wherein the preform includes vertical slits and notches in its free end.

Referring now to FIGS. 13–16, there is shown another embodiment of the invention wherein the breakaway band 18 remains attached to the skirt 14 of the sleeve 10 upon initial removal of the sleeve/crown seal combination from the bottle neck 54 as a result of strengthening the peripheral line of weakness 16 and providing one or more vertical lines of weakness 17 in the band 18. FIG. 13 shows the sleeve 10 as molded with crack initiating notches 70 leading into vertical grooves 72 ending in slots 26 which provide vertical lines of weakness 17 in the band 18. Between the slots 26 are bridges 24 connecting the upper end 20 of the band 18 to the skirt 14.

Figure 14:
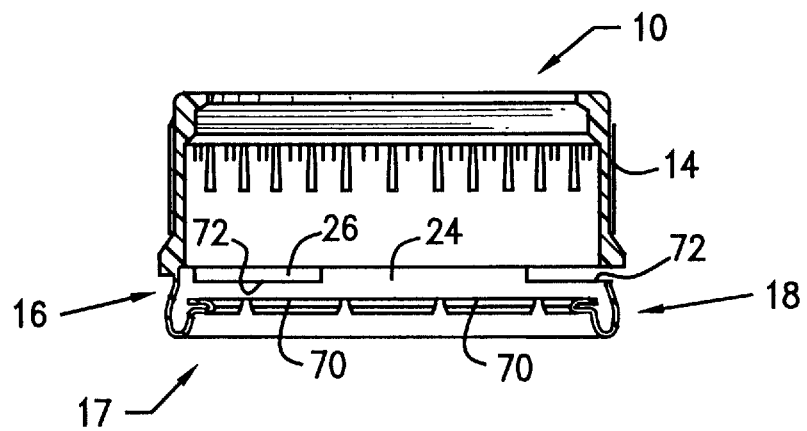
FIG. 14 is the same as FIG. 13, except that a "triangulated curl" breakaway band has been formed in the preform.

FIG. 14 shows the result of employing the curling operation on band 19 to produce the breakaway band 18 having a triangulated curl shape in which the notches 70 and the radial/vertical grooves 72 produce radial/vertical lines of weakness 17 throughout the full cross section of the breakaway band 18. During unthreading of the sleeve/crown seal combination, the bridges 24 are of sufficient cross section and strength to resist rupture. As a result, the stresses developed in the band 18 during unthreading concentrate at remaining portions of the radial/vertical grooves 72 in the lower and outer portions of the band 18 which thereupon rupture in a tearing action allowing the entire sleeve/crown seal combination with the broken band portions 76 to be removed intact from the bottle neck 54.

Figure 15:
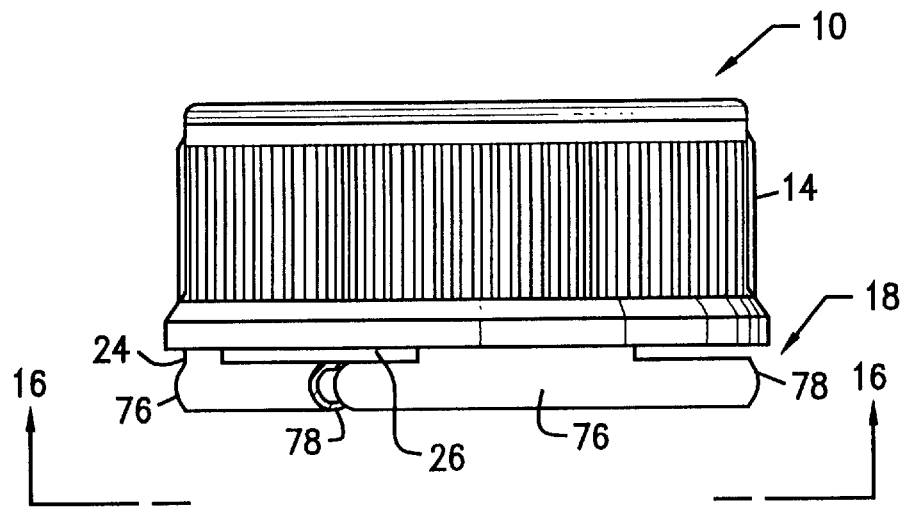
FIG. 15 is a front elevational view of the tamper evident sleeve of FIGS. 13 and 14 after the initial unthreading of the crown seal/sleeve combination, illustrating the ruptured vertical portions of the breakaway band about the circumference thereof while the band remains attached to the skirt of the sleeve.
Figure 16:
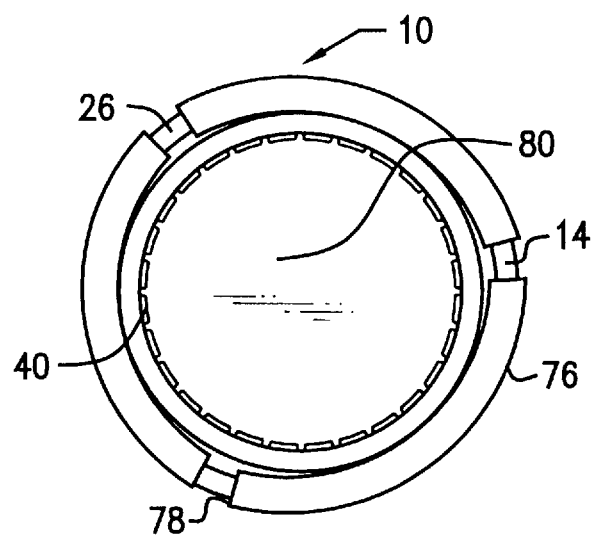
FIG. 16 is the bottom view of the sleeve of FIG. 15.

FIGS. 15 and 16 show the sleeve/crown seal combination after unthreading wherein, as a result of the hoop stresses imposed on the band 18 by the curling operation, the ends 78 of the broken band portions 76 spring outwardly making the tamper evidence more obvious while at the same time facilitating the recapping of the bottle by displacing the band portions outwardly from the sleeve lower opening 80. The degree to which the broken band portions 76 and their ends 78 spring outwardly is governed by the lengths of the slots 26 and the amount of hoop stress developed by the curling operation. This embodiment of the breakaway band and a method of making the same is described in detail in applicant's U.S. Pat. No. 4,709,824 which is incorporated herein by reference.

Figure 17:
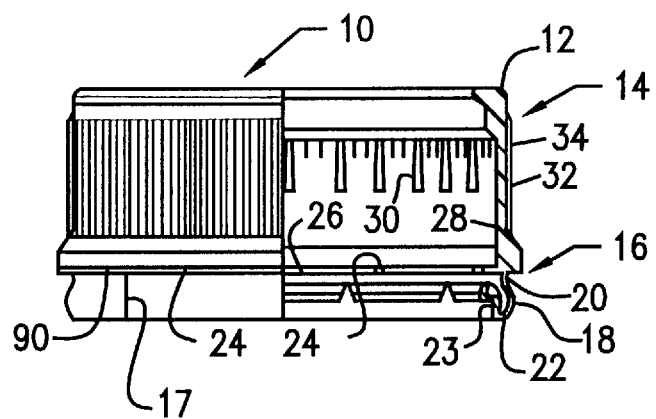
FIG. 17 is a front elevational view, in section, of another embodiment of the tamper evident sleeve after the triangulated curl breakaway band has been formed in the preformed, wherein the band includes a peripheral and vertical line of weakness and a hinge portion.
Figure 18:
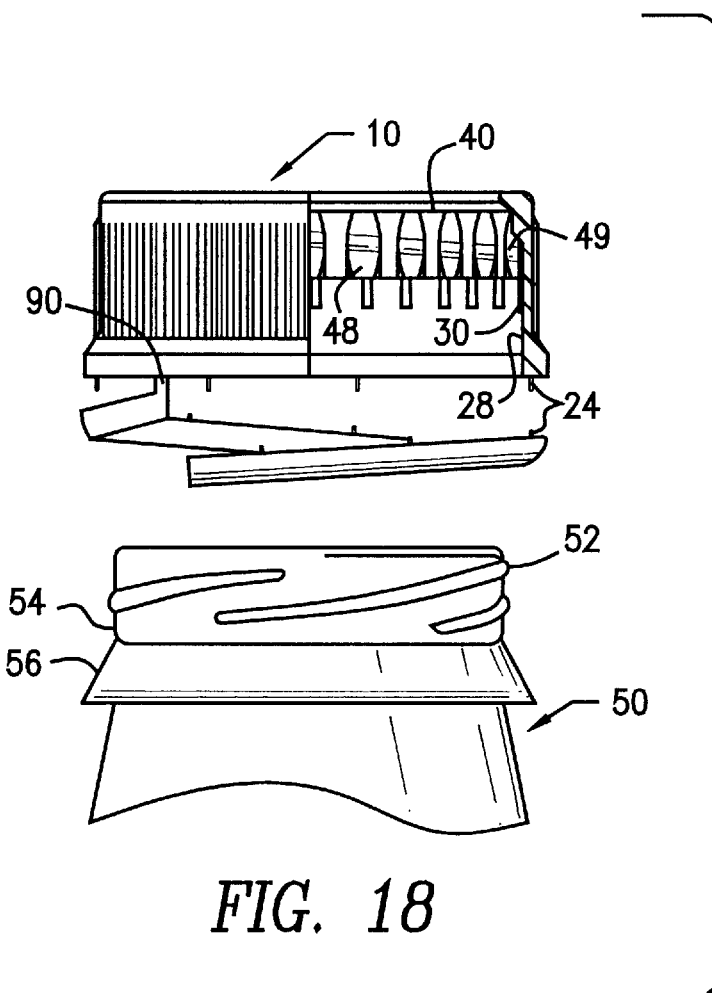
FIG. 18 is a front elevational view of the tamper evident sleeve of FIG. 17 after the initial unthreading of the crown seal/sleeve combination, illustrating the ruptured peripheral and vertical line of weakness of the breakaway band while the band remains attached to the skirt of the sleeve at the hinge portion.

Referring to FIGS. 17–18, there is shown another embodiment of the invention wherein only a portion of the breakaway band 18 remains attached to the skirt 14 of the sleeve 10 upon initial removal of the sleeve/crown seal combination from the bottle neck 54. This result is obtained by providing both a discontinuous peripheral line of weakness 16 and one vertical line of weakness 17 in the band 18. FIG. 17 shows the sleeve 10 with a triangulated curl breakaway band 18 prior to fitting the sleeve 10 over the crown seal on a bottle. The band 18 is attached to the skirt 14 by a discontinuous peripheral line of weakness 16 which includes a plurality of spaced apart frangible bridges 24 connecting the skirt 14 with the upper end 20 of the breakaway band 18 and slots 26 between and separating the bridges 24. The band 18 further includes a vertical line of weakness 17 immediately next to a hinge 90 which discontinues the peripheral line of weakness 16. The discontinuous peripheral line of weakness and vertical line of weakness preferably are produced after the curling operation is performed on the band 18 by a slitting operation. After the discontinuous peripheral line of weakness 16 and vertical line of weakness 17 are produced the sleeve 10 is applied over the crown seal of a bottle. Upon unthreading of the sleeve/crown seal combination from the bottle, the bridges 24 will rupture and the vertical line of weakness 17 will split the band 18, while the hinge 90 remains attached to the skirt 14 of the sleeve 10, thus forming a "pigtail" configuration which remains attached to the band. This is illustrated by FIG. 18. After initial removal of the sleeve/crown seal combination from the bottle, the "pigtail" breakaway band 18 may be removed from the sleeve by manually pulling the band 18 from the sleeve 10.

The breakaway band produced by the method of the present invention can be formed to provide a variety of curvilinear crosssectional shapes, such as an O, U, J, coil, trapezoidal or the triangulated curl configuration described above, depending on the movement, temperature and/or configuration of the working surface 64 of the tool utilized to perform the curling operation. A method suitable for forming such cross sectional configurations is described in applicant's U.S. Pat. No. 4,709,824. By utilizing the described curling technique to curl the lower annular band 19 and thereby obtain the breakaway band 18, the inherent physical properties of the plastic is altered in such a way as to enhance its neck-engagement tenacity of the breakaway band 18. That is, the plastic at the inwardly directed interfering portion 23 of the breakaway band 18 is made stronger, more resilient and creep resistant as a result of the stresses imposed on the plastic during the curling operation. This is also explained in detail in applicant's U.S. Pat. No. 4,709,824.

The invention in its broader aspects is not limited to the specific described embodiments and departures may be made therefrom within the scope of the accompanying claims without departing from the principles of the invention and without sacrificing its chief advantages.

We claim:

1. A tamper evident sleeve for use with a closure for the easy opening and closing of a container and for indicating the condition of the container, wherein the closure includes a skirt with external and internal engaging means, wherein the container includes an opening, external engaging means and an interfering means thereon and wherein the sleeve is adapted to be on the closure when the closure closes the container, said tamper evident sleeve comprising:

an annular skirt having an internal engaging means adapted to engage the external engaging means of the closure and to fit said sleeve on the closure to cause the closure to rotate in cooperation with said sleeve when rotational force is imparted upon said sleeve; and an annular breakaway band depending from said skirt of said sleeve and including frangible means, and engaging means for engaging the interfering means on the container, wherein said engaging means of said band is adapted to engage the interfering means on the container and cause said frangible means to separate upon initial removal of said sleeve and closure from the bottle, to thereby provide a clear indication of the condition of the container.

2. The sleeve of claim 1, further comprising a top portion which is adapted to rest upon a top portion of the closure when said sleeve is on said closure.

3. The sleeve of claim 1, wherein said closure is a twist-off crown seal, said external sleeve-engaging means are flutes and said container is a bottle.

4. The sleeve of claim 3, wherein said means for engaging the external flutes of the crown seal comprise internal protrusions from said skirt.

5. The sleeve of claim 4, wherein the number of said protrusions is not the same as the number of flutes on the crown seal.

6. The sleeve of claim 4, wherein the number of said protrusions is less than the number of flutes on the crown seal.

7. The sleeve of claim 4, wherein the shape of said protrusions generally corresponds to the geometry of the flutes of the crown seal.

8. The sleeve of claim 3, wherein said skirt further comprises an outer surface with vertical ribs to facilitate gripping of the sleeve when imparting rotational force thereon.

9. The sleeve of claim 3, wherein said breakaway band further comprises a lower end having a curled portion which provides a reduced internal breadth which engages the underside of the interfering means on the bottle.

10. The sleeve of claim 9, wherein said breakaway band further comprises an upper section connected to said skirt by said frangible means, and a lower section having a free end extending inwardly and upwardly from said upper section by means of a connection portion wherein said free end is adapted to provide an engaging interference with the interfering means on the bottle to cause said frangible means to separate upon initial removal of said sleeve and crown seal, to thereby provide a clear indication of the condition of the bottle.

11. The sleeve of claim 9 wherein said curled lower end is radially flexible.

12. The sleeve of claim 3, wherein the breakaway band has a cross sectional configuration selected from the group consisting of an "O", "U", "J", coil, trapezoidal or triangulated curl shape.

13. The sleeve of claim 3, wherein said frangible means comprises an intermediate peripheral line of weakness between said skirt and said breakaway band.

14. The sleeve of claim 13, wherein said intermediate peripheral line of weakness includes one or more fracturable bridges.

15. The sleeve of claim 3, wherein said frangible means includes one or more vertical lines of weakness in said breakaway band whereby said band separates at each of said vertical lines of weakness upon initial removal of said sleeve and crown seal from the bottle, to thereby indicate the condition of the bottle.

* * * * *